April 28, 1964
A. J. ALLEGRETTI
3,130,793
LAWN TRIMMER AND EDGER
Filed June 7, 1962
2 Sheets-Sheet 1
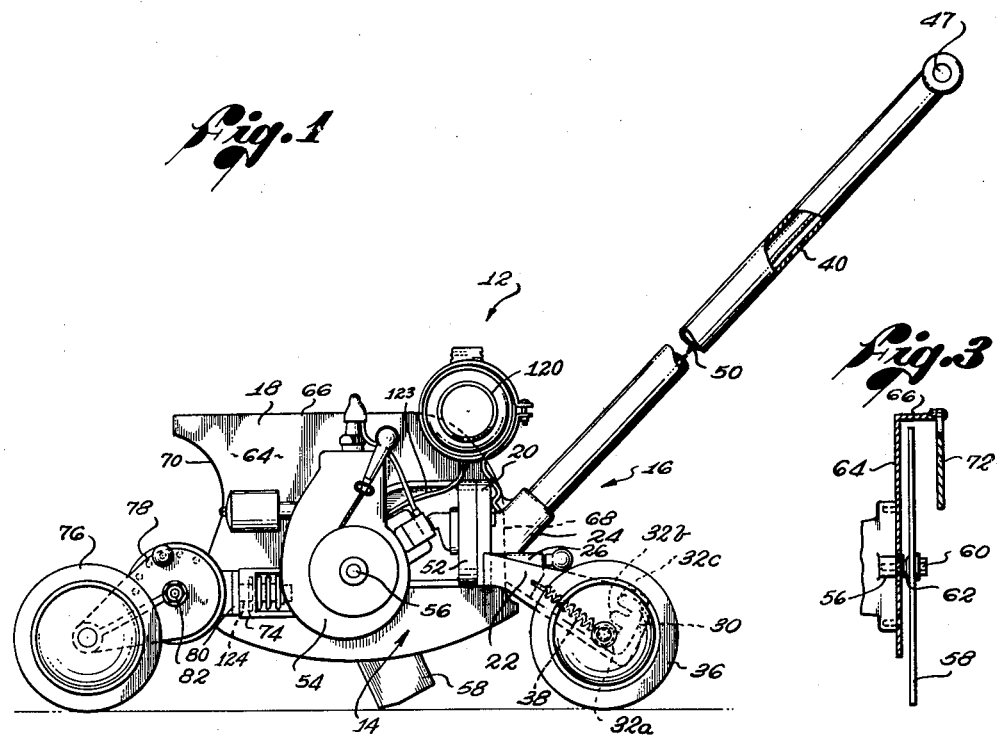
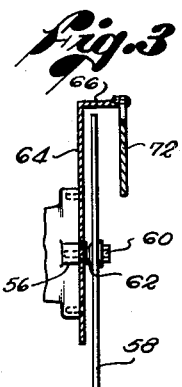
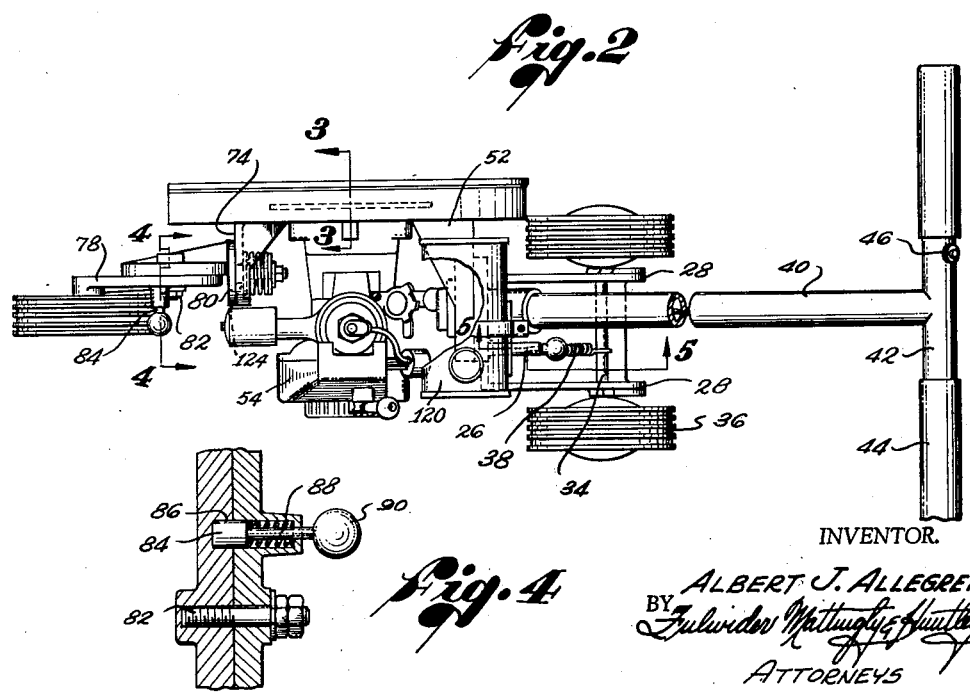
INVENTOR.
ALBERT J. ALLEGRETTI
BY Fulwider Mattingly & Huntley
ATTORNEYS April 28, 1964  A. J. ALLEGRETTI  3,130,793
LAWN TRIMMER AND EDGER
Filed June 7, 1962  2 Sheets-Sheet 2
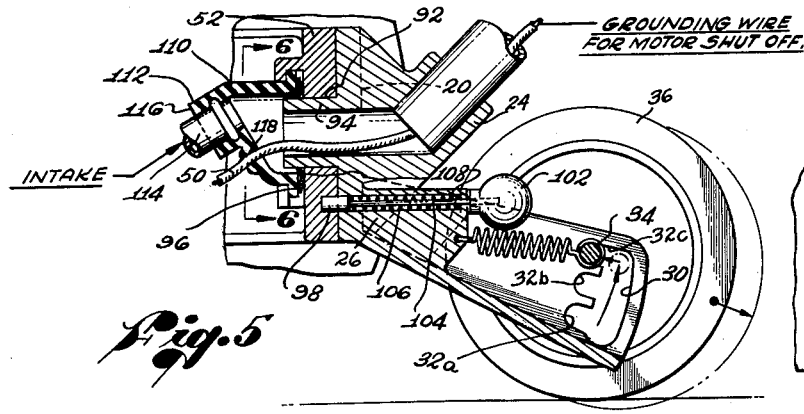
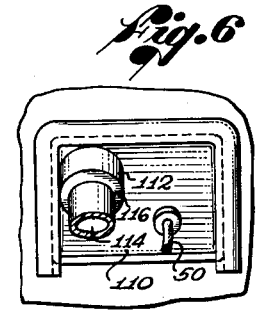
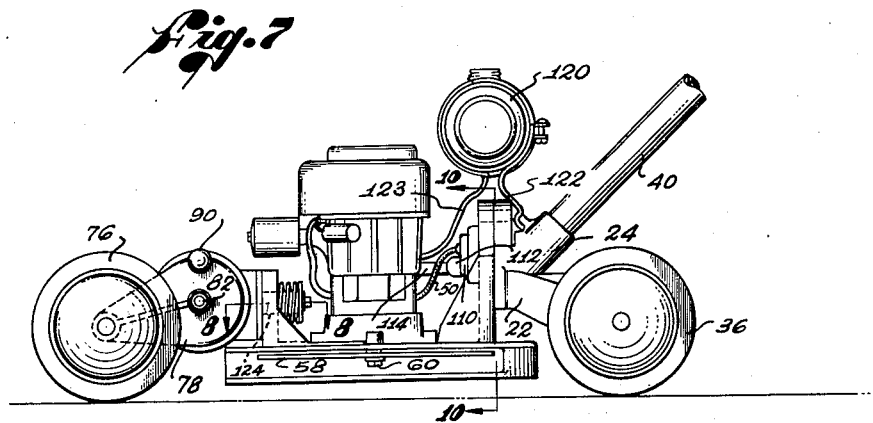
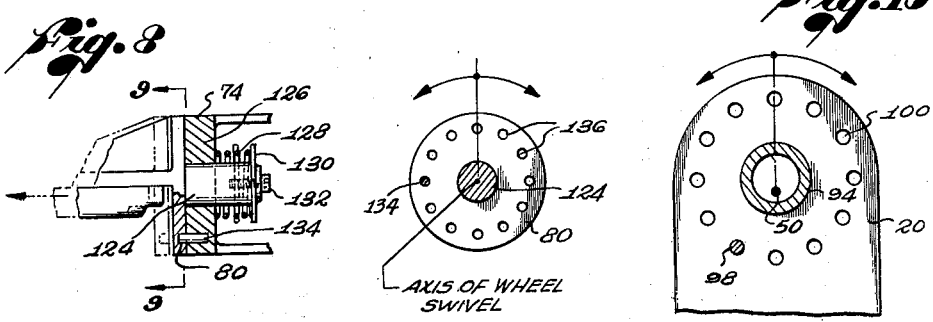
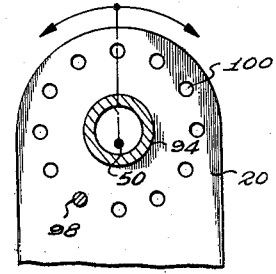
INVENTOR.
ALBERT J. ALLEGRETTI
ATTORNEYS

United States Patent Office 3,130,793
Patented Apr. 28, 1964

3,130,793
LAWN TRIMMER AND EDGER
Albert J. Allegretti, 7232 Fulton Ave.,
North Hollywood, Calif.
Filed June 7, 1962, Ser. No. 200,744
2 Claims. (Cl. 172—15)

My invention relates generally to lawn edgers and trimmers, and more particularly to a lawn edger and trimmer having an improved chassis for mounting a motor to drive the cutting blade of the machine.

The cutting blade in a common or conventional gas engine lawn edger and trimmer is normally mounted in a generally flat guard frame which is adjustably attached in front of the fixed chassis of the conventional machine. The gas engine is mounted to the chassis and drives the cutting blade through a suitable connecting belt and pulley mechanism. The flat guard frame is rotatably attached to the chassis on a generally longitudinal and horizontal axis so that it can be adjustably rotated from a horizontal down position to a vertical side position. The machine is used as a lawn trimmer when the flat guard frame and the cutting blade mounted therein are in the horizontal down position, and used as a lawn edger when the guard frame is oriented in the vertical side position. The guard frame and cutting blade can, of course, be adjusted to intermediate positions in which the machine may be used as a trenching device.

There is a certain and significant amount of slippage and loss of power between the gas engine and the cutting blade incurred in the connecting belt and pulley mechanism used in the conventional lawn edger and trimmer. This is apparent when it is understood that it is necessary to twist the connecting belt to some extent when the guard frame and cutting blade are oriented to certain positions. As a result, a larger gas engine is required to drive the cutting blade than would be necessary if the connecting belt and pulley mechanism were not used. The larger engine required is, of course, heavier and its fuel consumption is greater. In consequence, the chassis and fuel tank must also be larger to accommodate and supply the gas engine.

Incidental to the efficient operation of the gas engine of a lawn edger and trimmer, the air intake to the carburetor must be kept fairly clear and free of obstruction. However, the air filter for the intake of a conventional machine is located relatively close to the point of greatest activity; i.e., directly behind and near the ground where the grass is being cut. Since the average person very seldom cleans the air filter and, in fact, hardly even thinks about it, much less cleaning it at regular intervals, the air filter of the average machine is normally clogged to a good extent with dirt and grass. This, of course, further reduces the power and efficiency of the gas engine in driving the cutting blades.

Bearing in mind the foregoing, it is a major object of my invention to provide a new and improved lawn edger and trimmer which is highly efficient and lightweight in comparison to the conventional machine.

Another object of this invention is to provide a lawn edger and trimmer wherein the cutting blade of the machine is effectively driven without loss of power by the gas engine of the machine.

A further object of the invention is to provide a lawn edger and trimmer in which the cutting blade of the machine can be easily adjusted to different orientations and be efficiently driven without loss of power by the gas engine of the machine in all such positions.

A still further object of the invention is to provide a lawn edger and trimmer in which the air intake of the gas engine of the machine is kept free of any obstruction, such as grass or dirt, without the need of cleaning an air filter at regular intervals and in which the air filter may be omitted, if desired.

Briefly, and in general terms, the foregoing and other objects are preferably accomplished by providing a lawn edger and trimmer including a chassis having an adjustable frame also serving as a guard plate mounting a front wheel and a pair of rear wheels, the frame mounting a gas engine which is directly coupled to drive the cutting blade located within the guard plate, and an extended handle connected to the chassis frame for pushing and steering the machine, the handle having an opening remote from the cutting blade and ground, and a passageway therein connecting the opening with the air intake of the gas engine. The guard plate portion of the frame is generally flat and the gas engine is mounted on the guard plate portion with its output shaft perpendicular to and through the guard plate, the cutting blade being suitably mounted to the end of the output shaft on the other side of the guard plate. The guard plate portion of the frame is rotatably mounted on a longitudinal and horizontal axis so that the guard plate including the mounted gas engine and cutting blade are jointly rotated with the guard plate to different orientations. The front wheel is attached to the guard plate on an arm which is rotatably mounted on a longitudinal and horizontal axis with respect to the guard plate. The front wheel is additionally adjustable on its arm to vary the height of the front end of the guard plate from the ground. Similarly, the rear wheels are adjustable relatively to the frame to vary the height of the rear end of the frame from the ground.

My invention will be more fully understood, and other objects and advantages of the invention will become apparent from the following description of a preferred embodiment of the invention to be taken in conjunction with the attached drawings, in which:

FIGURE 1 is a side elevational view of a lawn edger and trimmer according to my invention in which the machine is shown adjusted for edging operation;

FIGURE 2 is a top plan view of the lawn edger and trimmer shown in FIGURE 1;

FIGURE 3 is a fragmentary sectional view taken substantially along the line 3—3 as indicated in FIGURE 2;

FIGURE 4 is a fragmentary sectional view taken substantially along the line 4—4 as indicated in FIGURE 2;

FIGURE 5 is a fragmentary sectional view taken substantially along the line 5—5 as indicated in FIGURE 2;

FIGURE 6 is a fragmentary sectional view taken substantially along the line 6—6 as indicated in FIGURE 5;

FIGURE 7 is a side elevational view of the lawn edger and trimmer in which the machine is shown and adjusted for trimming operation;

FIGURE 8 is a fragmentary sectional view taken substantially along the line 8—8 as indicated in FIGURE 7;

FIGURE 9 is a view taken along the line 9—9 as indicated in FIGURE 8; and

FIGURE 10 is a fragmentary sectional view taken substantially along the line 10—10 as indicated in FIGURE 7.

Referring to FIGURE 1, the lawn edger and trimmer according to my invention is there shown adjusted for edging operation. The machine 12 has a frame 14 which includes a fixed rear portion 16 and an adjustable guard plate portion 18. The fixed rear portion 16 has a laterally vertical forward plate 20 and an angularly downward channel member 22 extending rearwardly therefrom. Integral with the plate 20 is a tubular member 24 extending upwardly and rearwardly from the plate 20. Adjacent to the tubular member 24 is a longitudinally vertical plate member 26 which is integrally affixed to the plate 20 and channel member 22 as illustrated in FIGURE 1.

The channel member 22 has a pair of parallel, longitudinally vertical side flanges 28 which are laterally spaced or separated as shown in FIGURE 2. Cutouts 30 (FIGURES 1 and 5) are made at the thicker rear ends of the flanges 28 to provide, for example, three notches 32a, 32b and 32c in each cutout. A pair of corresponding notches such as 32a engage two axially spaced points on axle 34 which mounted two rear wheels 36 rotatably on the ends thereof. A tension spring 38 connecting the axle 34 to the plate member 26 applies a spring load on the axle 34 to maintain it in the pair of corresponding notches such as 32a.

An elongated tube 40 is inserted into and secured to the tubular member 24, and has a pair of hollow handle bars 42 affixed to the outer end. A pair of grips 44 are mounted on respective ends of the handle bars 42, and a grounding switch 46 is mounted within one of the handle bars near the inner end thereof, as shown in FIGURE 2. The outer end of each of the pair of grips preferably has an opening 47 connecting with the atmosphere, and the tube 40 has an opening 48 remotely located from the ground, generally near the handle bars as can be seen in FIGURE 1. The hollow handle bars 42 and the tube 40 thus serve as passageways or conduits for conducting atmospheric air through the openings 47 and 48 down into the tubular member 24. A wire 50 connecting with the grounding switch 46, also runs through one of the handle bars from the switch and down the tube 40 to the tubular member 24.

The vertical plate 20 has a longitudinally horizontal tubular member 94 (FIGURE 5) extending axially forward from the plate 20, and this tubular member rotatably mounts the guard plate portion 18 through a bracket plate 52. The bracket plate 52 has a hole 92 bored perpendicularly through it, and is rotatably secured on the forwardly extending tubular member 94 of the plate 20. The passageway of this tubular member extends through the plate 20 and connects with the passageway of the rearwardly extending tubular member 24. The guard plate portion 18 has the housing of a conventional gas engine 54 fastened to the plate so that the output shaft 56 of the engine is substantially perpendicular to the generally flat plane of the guard plate portion 18. As shown in FIGURE 3, a double ended cutting blade 58 is mounted to the end of the output shaft 56. The cutting blade 58 is rotatably mounted on the shaft of a bolt 60 which is axially secured to the end of the output shaft 56. The cutting blade 58, however, is frictionally prevented from rotating on the shaft of bolt by a compressed spring 62 which spring loads the blade 58 from the end of output shaft 56 against the flange surface of the head of bolt 60. The cutting blade 58 will slip on the shaft of bolt 60 when it encounters an obstruction which overcomes the frictional holding force due to spring 62.

The guard plate portion 18 includes a main plate 64 having a side flange 66 which runs along edges 68 and 70. Another plate 72 is fastened to the side flange 66 to partially enclose the cutting blade 58 as shown in FIGURE 3. The gas engine 54 is mounted to the main plate 64 of the guard plate portion 18. The guard plate portion 18 has a smaller, laterally vertical plate 74 near the front of the main plate 64. This plate 74 is used to mount a front wheel 76 to the main plate 64.

The wheel 76 is rotatably mounted on the end of an arm 78 which is rotatably mounted on the other end to a swivel plate 80. The swivel plate 80 is mounted to the plate 74 so that it can be adjustably rotated and positioned on a normally longitudinal and horizontal axis which is perpendicular to the plane of the laterally vertical plate 74. The swivel plate 80 extends longitudinally forward as does the arm 78 and then joined together at the center of two contiguous faces by a bolt 82. The axis of the bolt 82 is at right angles to the swivel axis of plate 80 so that the arm 78 can be angularly rotated on bolt 82 to raise or lower the wheel 76 relative to the swivel axis. The arm 78 is held in fixed position with respect to the swivel plate 80 by means of a spring loaded pin 84 which engages one of a series of holes 86 in the contiguous face of plate 80. This is clearly shown in FIGURE 4 wherein rod 88 is attached to the pin 84 on one end, and a knob 90 is provided on the other end to pull the pin 84 out from a hole 86 to release arm 78 for adjustment thereof. The front end of the machine is thus raised or lowered with respect to the ground.

The guard plate portion 18 and its mounted gas engine 54 can be adjustably rotated about the axis of hole 92 of the bracket plate 52, as shown in FIGURE 5. The bracket plate 52 is rotatably secured to the forwardly extending tubular member 94 of plate 20 by a serrated lock washer 96. Orientation of the guard plate portion 18 is set by a pin 98 which engages one of a series of holes 100 circularly spaced about the hole 92 in the bracket plate 52. The pin 98 is connected to a knob 102 by rod 104 which passes through the center of a compression spring 106. The compression spring 106 is housed in a longitudinal and normally horizontal hollow 108 in the plate member 26 and provides a spring load forwardly against the pin 98. As can be seen in FIGURE 5, movement of the axle 34 from a lower pair of notches 32a to an upper pair of notches 32c lowers the rear end of the machine from the condition shown in FIGURE 1 to a condition nearer to the ground.

A rubber boot 110 is suitably secured over the end of the tubular member 94 as shown in FIGURE 5, and has a protruding tubular member 112 which engages the end of the intake member 114 of the gas engine 54. The boot 110 is generally rectangular as can be seen in FIGURE 6, and has a sloping forward face 116 from which the tubular member 112 protrudes. The grounding wire 50 from tube 40 passes through the passageway of the tubular member 94 and through a hole 118 in the boot 110 to the ignition circuit for the gas engine 54.

A gas tank 120 is fixedly mounted on a plate 112 attached to the vertical plate 20, and has a flexible fuel line 123 connecting a lower point of the tank 120 to the carburetor of the gas engine 54, as shown in FIGURE 1. The fuel line 123 is sufficiently long and flexible to permit adjustment of the guard plate portion 18 and gas engine 54 from the edging position of FIGURE 1 to the trimming position of FIGURE 7. When this adjustment is made, the front wheel 76 is moved to a horizontal condition and must, of course, be correspondingly adjusted back to vertical, as illustrated in FIGURE 7.

The swivel plate 80 has a rearwardly extending mounting shaft 124 which passes through a hole 126 in the plate 74. The swivel plate 80 is held against the plate 74 by a compression spring 128 which loads the swivel plate 80 in a rearward direction through disc 130 attached to the end of the mounting shaft 124 by a screw 132. A locking pin 134 is pressed-fitted into a hole in the plate 74 as shown in FIGURE 8, and normally engages one of a series of holes 136. These holes 136 are clearly shown in FIGURE 9, and can be seen to be arranged in a circle about the axis of the mounting shaft 124. The front wheel 76 can be adjusted by pulling the swivel plate 80 forward against the force of spring 128 until the pin 134 is disengaged from a hole 136, and rotating the wheel 76 to a desired orientation. A sufficient number of holes 136 is provided in plate 80 to permit close adjustment of the wheel 76 to the desired position.

From the foregoing description of my invention, it is apparent that with a direct drive of the cutting blade 58 by the gas engine 54, a very efficient lawn edger and trimmer is obtained. The machine is extremely lightweight in comparison to conventional lawn edgers and trimmers, and is easily adjustable in various orientations and directions not possible with the conventional machine. Since the main air intake opening 48 and the grip openings 46 are located remotely from the cutting point at the ground, and the air intake member 114 is fully enclosed by boot 110, no air filter is required on the intake member 114 to prevent dirt and grass from clogging the air passageway to the gas engine. The adjustable wheels, including an adjustable front wheel not normally found in the conventional machine, permits easy, stable and effective operation of the lawn edger and trimmer.

It is to be understood, however, that the particular embodiment of my invention described above and shown in the drawings is merely illustrative of, and not restrictive on the broad invention, and that various changes in design, structure and arrangement may be made in the disclosed embodiment of the invention without departing from the spirit and scope of the appended claims.

I claim:
1. A lawn edger and trimmer comprising:
   a guard plate;
   a gas engine secured to one side of said guard plate and having an output shaft extending through said guard plate to the other side of said guard plate;
   a cutter drivably mounted on the end of said output shaft to be disposed on the other side of said guard plate, said gas engine, cutter and guard plate being co-movable;
   a swivel plate integral with said guard plate extending laterally from said guard plate at the forward end of said plate;
   a support arm connected to said front swivel plate to extend forwardly therefrom and supporting a front wheel at the forward end of said arm, said arm having a rear face from which a shaft extends rearwardly to be journalled in said swivel plate;
   spring means biasing said face of said arm against said swivel plate, said face of said arm being formed with a plurality of equally circularly spaced apart index holes and said swivel plate having a protruding index pin selectively engageable with one of said holes to maintain said face of said arm in a desired angular relationship to said swivel plate, said spring means yielding to permit separation of said face from said swivel plate and removal of said index pin from one of said index holes to permit angular adjustment of said wheel supporting arm and front wheel whereby said front wheel is adjustable to a position in which the axis of said front wheel substantially parallels the output shaft of said gas engine or a position in which the axis of said front wheel is angularly related to said output shaft;
   a rear swivel plate integral on the rear end of said guard plate on said one side of said guard plate and substantially parallel to said front swivel plate;
   a rear wheel supporting member carrying a pair of rear wheels and having a forward end face normally angularly slidably contacting said rear swivel plate of said guard plate, said forward end face and said rear swivel plate being coaxially journalled together for relative angular movement whereby the axis of said rear wheels can be positioned in substantial parallelism to said output shaft of said gas engine or positioned angularly relative to said output shaft;
   a pin axially movably mounted in said rear wheel supporting member and spring biased to normally protrude forwardly beyond said face of said rear wheel supporting member to be receivable within one of a plurality of equally circularly spaced apart index holes formed in a rear face of said rear swivel plate, said pin serving to maintain said rear wheel supporting member and rear swivel plate in angularly adjusted position;
   an elongated tubular handle extending rearwardly and upwardly from said rear wheel supporting member and having a lower end in communication with a passageway extending coaxially through said rear swivel plate, said handle including at least one opening in the upper end thereof remote from said cutter for inducting air downwardly through said handle and through said passageway;
   a housing secured to the front side of said rear swivel plate to receive air from said handle, said housing having communication with a carburetor air intake of said gas engine in all angularly adjusted positions of said rear swivel plate relative to said front face of said rear wheel supporting member.

2. A lawn edger and trimmer comprising:
   a guard plate;
   a motor secured to one side of said guard plate and having an output shaft extending through said guard plate to the other side of said guard plate;
   a cutter drivably mounted on the end of said output shaft to be disposed on the other side of said guard plate, said motor, cutter and guard plate being co-movable;
   a swivel plate integral with said guard plate extending laterally from said guard plate at the forward end of said plate;
   a support arm connected to said front swivel plate to extend forwardly therefrom and supporting a front wheel at the forward end of said arm, said arm having a rear face from which a shaft extends rearwardly to be journalled in said swivel plate;
   spring means biasing said face of said arm against said swivel plate, said face of said arm being formed with a plurality of equally circularly spaced apart index holes and said swivel plate having a protruding index pin selectively engageable with one of said holes to maintain said face of said arm in a desired angular relationship to said swivel plate, said spring means yielding to permit separation of said face from said swivel plate and removal of said index pin from one of said index holes to permit angular adjustment of said whel supporting arm and front wheel whereby said front wheel is adjustable to a position in which the axis of said front wheel substantially parallels the output shaft of said motor or a position in which the axis of said front wheel is angularly related to said output shaft;
   a rear swivel plate integral on the rear end of said guard plate on said one side of said guard plate and substantially parallel to said front swivel plate;
   a rear wheel supporting member carrying a pair of rear wheels and having a forward end face normally angularly slidably contacting said rear swivel plate of said guard plate, said forward end face and said rear swivel plate being coaxially journalled together for relative angular movement whereby the axis of said rear wheels can be positioned in substantial parallelism to said output shaft of said motor or positioned angularly relative to said output shaft;
   a pin axially movably mounted in said rear wheel supporting member and spring biased to normally protrude forwardly beyond said face of said rear wheel supporting member to be receivable within one of a plurality of equally circularly spaced apart index holes formed in a rear face of said rear swivel plate, said pin serving to maintain said rear wheel supporting member and rear swivel plate in angularly adjusted position; and an elongated tubular handle extending rearwardly and upwardly from said rear wheel supporting member and having a lower end in communication with a passageway extending coaxially through said rear swivel plate.

References Cited in the file of this patent

UNITED STATES PATENTS

| | | |
|---|---|---|
| 2,597,774 | Britten | May 20, 1952 |
| 2,608,043 | Berdan | Aug. 26, 1952 |
| 2,707,858 | Norton et al. | May 10, 1955 |
| 2,867,960 | Stiles et al. | Jan. 13, 1959 |
| 2,894,761 | Knarzer | July 14, 1959 |
| 2,915,318 | Chesser | Dec. 1, 1959 |
| 2,931,156 | Fulwider | Apr. 5, 1960 |
| 2,938,323 | Livingston et al. | May 31, 1960 |
| 2,942,397 | Clark | June 28, 1960 |
| 3,034,275 | Happe et al. | May 15, 1962 |
| 3,055,438 | Wood et al. | Sept. 25, 1962 |